United States Patent [19]

Le Penven et al.

[11] 4,382,535
[45] May 10, 1983

[54] METHOD, DEVICE AND FILLER METAL FOR FLUXLESS SOLDERING

[75] Inventors: Yves Le Penven, Fontenay sous Bois; Danial Gabard, Paris, both of France

[73] Assignee: Centre Technique des Industries Mecaniques (CETIM), Senlis, France

[21] Appl. No.: 216,006

[22] Filed: Dec. 12, 1980

[30] Foreign Application Priority Data

Dec. 17, 1979 [FR] France .................. 79 30824

[51] Int. Cl.³ .............................................. B23K 1/06
[52] U.S. Cl. ...................................... 228/262; 228/56
[58] Field of Search .................... 228/1 A, 56 A, 110, 228/111, 262

[56] References Cited

U.S. PATENT DOCUMENTS

| 3,752,381 | 8/1973 | Watson | 228/1 A |
| 3,762,368 | 10/1973 | Strube | 228/1 A |
| 3,989,179 | 11/1976 | Antonevich | 228/1 A |
| 4,006,707 | 2/1977 | Denslow | 228/1 A |
| 4,203,531 | 5/1980 | Reichel | 228/56 A |

FOREIGN PATENT DOCUMENTS 2346095 12/1977 France .................. 228/1 A

Primary Examiner—Nicholas P. Godici
Assistant Examiner—Marc Hodak
Attorney, Agent, or Firm—Holman & Stern

[57] ABSTRACT

The invention relates to the soldering industry. The device comprises a frame supporting a crucible for a bath of molten filler metal, the bottom of the crucible being traversed in fluid-tight manner by a sonotrode sliding under the action of a jack fixed to the frame. An ultrasonic energy generator is associated with the sonotrode and controlled heating means are associated with the crucible. The active end of the sonotrode has a recess with at least one impression of a shape complementary with at least a portion of the outer surface of the parts to be soldered. The jack moves said active end alternately in and out of the bath. The invention is particularly useful for the soldering of aluminum tube cross-heads for heat exchangers.

14 Claims, 2 Drawing Figures

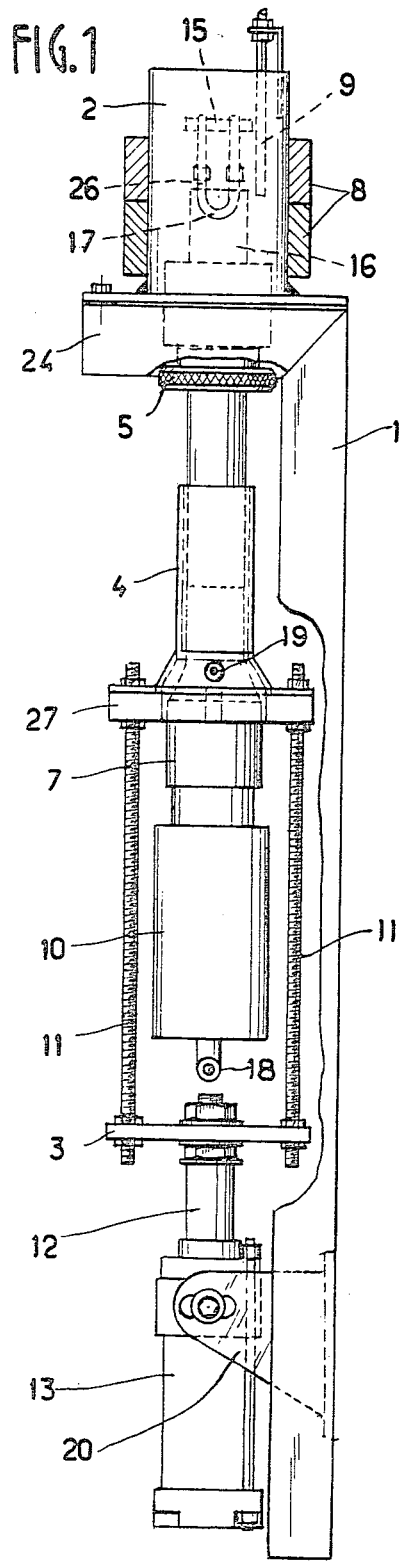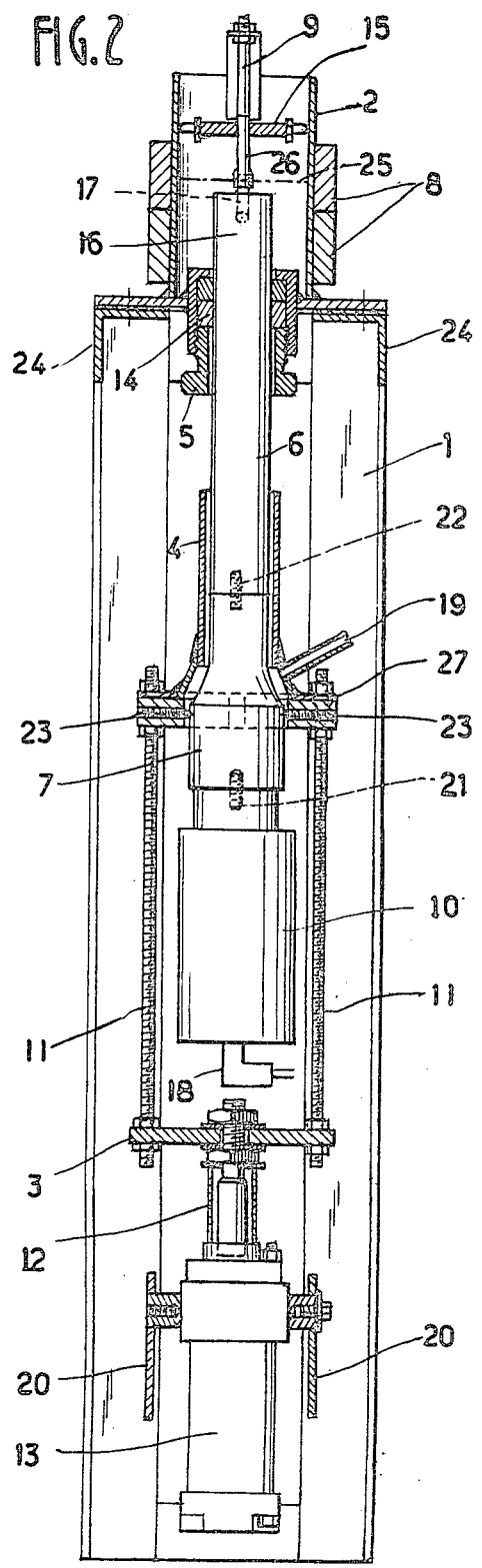

METHOD, DEVICE AND FILLER METAL FOR FLUXLESS SOLDERING

BACKGROUND OF THE INVENTION

1. Field of the Invention

The present invention relates to an improved method for the soldering of metal parts, as well as to a device and to a filler metal for the application of said method.

It is directed more particularly to the soldering of parts, notably of aluminum tubes, and it has a very special advantage for the construction of heat exchangers.

2. Description of the Prior Art

The soldering of aluminum without flux, is at present carried out mostly by immersion of the part to be soldered in a bath of liquid filler metal and by vibrating the bath. This vibration is generally done by means of sonotrodes (heads) connected to a generator of ultrasonic energy and fixed to the outside of the tank containing the filler metal. Such a technique is notably described in U.S. Pat. No. 3,680,200.

These conventional soldering methods have a certain number of drawbacks well-known to technicians. These drawbacks, due principally to a lack of homogeneity of the ultrasonic field are manifested generally by a lack of wettability causing local filler metal defects inside the weld which weakens the latter so as to render it defective.

In addition, notably in the case of soldering of aluminum, the filler metal generally used is an alloy of zinc and of aluminum and of beryllium, as in French Pat. No. 73-29 383, or alloys of aluminum and yttrium, germanium, indium, silver, as in French Pat. No. 73-35 575, or other conventional alloys used for the soldering or welding of the aluminum.

Generally, the object sought is to avoid any soiling of the soldered area, and any troublesome overheating of the parts to be soldered and of the equipment used.

The important feature is the wetting of the metal of the part to be soldered by the molten filler metal.

It has appeared that it is more important according to the present invention that the ultrasonic energy be applied to the parts to be soldered rather than to the soldering bath, since thus the ultrasonic energy is concentrated where it is most useful, that is to say at the locus of the soldering.

It is an object of the invention to overcome the faults and drawbacks of conventional methods.

It is another object of the invention to overcome the faults and drawbacks of conventional devices.

It is yet another object of the invention to overcome the faults and drawbacks of conventional filler metals.

Other objects and advantages of the invention will emerge from the description which follows.

GENERAL DESCRIPTION OF THE INVENTION

According to the invention there is provided a method for the fluxless soldering of metal parts comprising: placing the portions to be soldered of these parts in intimate contact with a sonotrode, immersing the parts-sonotrode assembly in a bath of molten filler metal, subjecting the portions to be soldered to ultrasonic energy emitted by the sonotrode, withdrawing the parts to be soldered from the bath, and allowing these soldered parts to cool.

For practising such a method applied to the soldering of aluminum parts, it is particularly advantageous to use a filler metal constituted of zinc, or of cadmium, or an alloy including at least zinc and cadmium, and more particularly a binary alloy including about 66% of cadmium and 34% of zinc, melting between about 265° and 305° C.

The portion of the sonotrode which has to be in contact with the filler metal bath is advantageously of unalloyed titanium, which is passivated by thermal oxidation, prior to its first use.

According to the invention there is also provided a device for soldering using such a method characterized in that it comprises a frame supporting a crucible for a bath of molten filler metal, the bottom of the crucible being traversed in fluid-tight manner by a sonotrode sliding under the effect of a jack fixed to the frame, with an ultrasonic energy generator associated with the sonotrode, and controlled heating means, associated with this crucible, the active or working end of the sonotrode has a recess with at least one impression of shape complementary with at least one portion of the outer surface of the parts to be soldered, the jack moving the active end alternately in and out of the bath.

In such a device for soldering U-tube cross-head socket-type joints, the recess provided in the active end of the sonotrode advantageously has the shape of a semi-circular recess with a U-shaped generator of dimensions slightly greater than those of the outer envelope of the cross-head or workpiece.

This active end is also, preferably, of passivated, unalloyed titanium. An amplifier, constituted by a profiled metallic cross-member, advantageously of titanium, is arranged between the ultrasonic energy generator and the sonotrode.

In order to protect the ultrasonic energy generator from excessive heating, it is advantageous to arrange a cooler, notably by air-blast, between the sonotrode and the ultrasonic energy generator.

In such a device, it is advantageous according to the invention, to place the sonotrode in a position through the bottom of the crucible when in the working position of the sonotrode at a node of ultrasonic vibrations, whilst the seals between sonotrode, amplifier and ultrasonic energy generator are situated conventionally at ultrasonic vibration antinodes.

It is preferable, according to the invention, provide fluid-tight seals with a high absorption coefficient of ultrasonic energy to line the passage of the sonotrode through the bottom of the crucible, in order to avoid any interfering propagation of ultrasonic energy into the crucible.

According to the invention there is also provided a filler metal for the soldering of aluminum parts according to the method and/or the device of the invention, characterised in that it is constituted by an alloy including at least zinc and cadmium, of melting point below about 450° C.

BRIEF DESCRIPTION OF THE DRAWINGS

The invention will be better understood on reading the detailed description which follows and on examining the accompanying drawings which show by way of non-limiting example one embodiment of the invention. In these drawings:

FIG. 1 is a view in elevation, of the profile of a device according to the invention for soldering a U-shaped cross-head socket-type joint of two tubes, and, FIG. 2 is a front view, similar to that of FIG. 1, of the same device, with certain portions in section.

DESCRIPTION OF A PREFERRED EMBODIMENT

The device shown in the drawings comprises essentially a rigid frame 1, vertical, terminated at the top by a bracket 24 which supports a crucible 2 containing the molten filler metal to a level indicated by a line of dashes at 25. This crucible 2 is heated by conventional annular external electrical resistances 8. The temperature inside the bath is controlled by a heat probe 9.

Within the crucible, an assembly to be soldered 26 constituted by two tubes whose ends are force-fitted respectively to the arms of a cross-head, is held by a clamp 15 which centers it and which slides freely within the crucible 2.

The U-shaped end of the cross-head 26 is supported in a recess 17 of a complementary shaped hollow portion in the active or working end 16 of a sonotrode 6 of titanium.

The sonotrode 6 slides in fluid-tight manner through a stuffing-box 5 lined with fluid-tight rings 14 of material resistant to temperature and of high ultrasonic absorption coefficient such as graphited asbestos, which avoids any interfering propagation of ultrasonic energy into the crucible.

This sonotrode 6 is secured to an ultrasonic energy amplifier 7, also of titanium, through an axial screw 22. The amplifier 7 is also secured by an axial screw 21 to a generator of ultrasonic energy 10 constituted advantageously by a piezo-electric convertor connected to a suitable source of electricity through a pipe 18. Before the first use, the sonotrode 6 is subjected to passivation by oxidation by heating the sonotrode in ambient air and at atmospheric pressure to about 450° C. for 24 hours. This treatment renders the sonotrode practically insensitive to corrosion under the conditions of utilization.

A cooler 4, constituted by a metal sheath encircling the lower portion of the sonotrode 6 and the upper portion of the amplifier 7, permits cooling under the action of an air jet introduced through a nozzle 19. The amplifier is secured, by radial screws 23, to a plate 27 connected by four threaded rods 11 to a clamp 3 fixed to the end of a cross-member 12, which is in turn secured to the piston of a jack 13 that is attached by lugs 20 to the frame 1.

In order to ensure good transmission of the ultrasonic energy from the generator 10 to the amplifier 7, and to the sonotrode 6, the total length of the amplifier 7, as well of the length of the sonotrode 6, are multiples of the half-wave-length of the ultrasonic energy emitted by the generator 10.

In the same way, the screws 23 are located at a vibrational node of the ultrasonic wave train, in order not to offer any impedance to its propagation.

In considering the drawings, it is seen that the ultrasonic energy generator 10, the amplifier 7, and the sonotrode 6 form an integral unit, movable axially under the action of the jack 13. Through the action of this jack, the sonotrode 6 slides in fluid-tight manner through the stuffing-box 5, and permits immersion and emersion of the cross-head 26, into and out of the bath of molten filler metal.

To solder a cross-head unit such as 26, the procedure is to start by bringing the filler metal bath to the molten state, the upper level thereof bounding the soldering zone. The cooler 4 being supplied with pressurized air through the nozzle 19, the active end 16 of the sonotrode is caused to emerge by the action of the jack 13. The assembly 26 is then positioned in the impression 17 where it rests under its own weight.

The sonotrode is then lowered to its immersed position under the action of the jack 13, the temperature is allowed to rise, and then the ultrasonic energy generator is placed in operation for a sufficient time to ensure cleaning, without detrimmental corrosion of the parts to be soldered and their wetting by the filler metal. The sonotrode bearing the soldered cross-head is again caused to emerge, under the action of the jack 13, the cross-head unit is separated from the sonotrode and it is allowed to cool until hardening of the solder occurs.

By way of practical example, it is possible to use a sonotrode of titanium of the commercial brand T40, of diameter of about 40 mm, for a length of about 250 mm. An ultrasonic energy emitter of the piezo-electric type is used emitting ultrasonic energy at a frequency of about 20 kHz with a power of 1100 W, and of rated vibration amplitude of about 11.2 $\mu$m.

For aluminum tubes of about 10 mm external diameter when using a binary 34/66% zinc-cadmium filler metal melting between about 265° and 305° C., the heating time is of the order of 40 seconds, whilst the ultrasonic energy emission is about 5 seconds.

Of course, the invention is in no way limited to the embodiment described and shown, it is capable of numerous modifications available to the technician skilled in the art, according to the uses contemplated and without departing however from the scope of the invention.

Thus, according to the uses contemplated, it is possible to use any sonotrode of suitable conventional type and emitters of ultrasonic energy by megnetostriction, electrostriction, as well as by quartz, of different wavelengths. It is also possible to arrange a device according to the invention for the simultaneous soldering of several units. It is possible also to use any suitable filler metal for particular applications.

I claim:

1. In a method for fluxless soldering of metal parts comprising subjecting the parts immersed in a molten bath of filler metal to the action of ultrasonic energy before withdrawing said parts from said bath and allowing them to cool, the improvement comprising: first placing said parts in intimate contact with a sonotrode, and then immersing said parts and sonotrode together in the molten bath before causing said sonotrode to emit ultrasonic energy.

2. Method according to claim 1, wherein at least the part of the sonotrode which has to be placed in contact with the bath of filler metal is of unalloyed titanium which is made passive by thermal oxidation prior to its first use.

3. An ultrasonic soldering device, comprising:
 a frame;
 a receptacle supported by said frame and adapted to contain filler material, said receptacle having an aperture in a lower portion thereof;
 a means adapted to heat the filler material, said heating means associated with said receptacle;
 a sonotrode having a working end slideably and sealingly projecting through the aperture in said receptacle, the working end of said sonotrode having a surface configurationally complementary to a part of a workpiece which defines means to contact said part of said workpiece, such that ultrasonic energy is concentrated at the locus of soldering;

an ultrasonic energy amplifier secured to the other end of said sonotrode;

an ultrasonic energy generator secured to said ultrasonic energy amplifier; and a means for slideably moving said sonotrode through said aperture.

4. An ultrasonic soldering device, comprising:

a frame;

a receptacle supported by said frame and adapted to contain filler material, said receptacle having an aperture in a lower portion thereof;

a means adapted to heat the filler material, said heating means associated with said receptacle;

a sonotrode having a working end slideably and sealingly projecting through the aperture in said receptacle, the working end of said sonotrode having a surface configurationally complementary to a part of a workpiece which defines means to contact said part of said workpiece, such that ultrasonic energy is concentrated at the locus of soldering, the portion of the working end which is adapted to be in contact with the filler material being of unalloyed titanium made passive by thermal oxidation;

an ultrasonic energy amplifier secured to the other end of said sonotrode;

an ultrasonic energy generator secured to said ultrasonic energy amplifier; and a means for slideably moving said sonotrode through said aperture.

5. An ultrasonic solering device according to claim 3, wherein, in use, the portion of said sonotrode adjacent the aperture corresponds to an acoustical nodal region.

6. An ultrasonic soldering device according to claim 4, wherein, in use, the portion of said sonotrode adjacent the aperture corresponds to an acoustical nodal region.

7. An ultrasonic soldering device according to claim 3, wherein the aperture in said receptacle is lined with fluid-tight seals of a material with a high coefficient of absorption of ultrasonic energy.

8. An ultrasonic soldering device according to claim 4, wherein the aperture in said receptacle is lined with fluid-tight seals of a material with a high coefficient of absorption of ultrasonic energy.

9. An ultrasonic soldering device according to claim 3, for soldering U-tube workpieces, wherein the configurationally complementary surface of the working end of the sonotrode has the shape of a semi-toric recess with a U-shaped generator of dimensions slightly greater than those of the outer envelope of the workpieces.

10. An ultrasonic soldering device according to claim 4, for soldering of U-tube workpieces, wherein the configurationally complementary surface of the working end of the sonotrode has the shape of a semi-toric recess with a U-shaped generator of dimensions slightly greater than those of the outer envelope of the workpieces.

11. An ultrasonic soldering device according to claim 5, for the soldering of U-tube workpieces, wherein the configurationally complementary surface of the working end of the sonotrode has the shape of a semitoric recess with a U-shaped generator of dimensions slightly greater than those of the outer envelope of the workpieces.

12. Device according to claim 3, wherein at least the contact means of the surface of the sonotrode is of passivated unalloyed titanium.

13. Device according to claim 3, wherein the ultrasonic energy generator is connected to the sonotrode through an amplifier constituted by a profiled metallic cross-member.

14. Device according to claim 11, wherein the generator of ultrasonic energy is connected to the sonotrode through an amplifier constituted by a profiled metallic cross-member.

* * * * *